(12) United States Patent
Gibson (10) Patent No.: US 8,305,220 B2
(45) Date of Patent: Nov. 6, 2012

(54) MONITORING AND DISPLAYING ACTIVITIES

(75) Inventor: David John Michael Gibson, Wellington (NZ)

(73) Assignee: Say Systems Ltd (NZ)

( * ) Notice: Subject to any disclaimer, the term of this patent is extended or adjusted under 35 U.S.C. 154(b) by 506 days.

(21) Appl. No.: 12/526,263

(22) PCT Filed: Feb. 11, 2008

(86) PCT No.: PCT/NZ2008/000026
§ 371 (c)(1),
(2), (4) Date: Aug. 7, 2009

(87) PCT Pub. No.: WO2008/097111
PCT Pub. Date: Aug. 14, 2008

(65) Prior Publication Data
US 2010/0321189 A1    Dec. 23, 2010

(30) Foreign Application Priority Data
Feb. 9, 2007    (NZ) .................................. 553146

(51) Int. Cl.
*G08B 23/00*    (2006.01)

(52) U.S. Cl. .................. 340/573.3; 340/573.1; 119/720
(58) Field of Classification Search ............... 340/573.1, 340/573.3; 119/720, 712, 721
See application file for complete search history.

(56) References Cited

U.S. PATENT DOCUMENTS

| | | | | |
|---|---|---|---|---|
| 4,618,861 | A * | 10/1986 | Gettens et al. | 340/573.3 |
| 6,375,612 | B1 * | 4/2002 | Guichon et al. | 119/51.02 |
| 6,571,193 | B1 * | 5/2003 | Unuma et al. | 340/853.2 |
| 6,941,239 | B2 * | 9/2005 | Unuma et al. | 340/8.1 |
| 7,059,275 | B2 * | 6/2006 | Laitinen et al. | 340/573.3 |
| 7,362,806 | B2 * | 4/2008 | Choi et al. | 375/240.16 |
| 2005/0081797 | A1 | 4/2005 | Laitinen et al. | |
| 2007/0175406 | A1 * | 8/2007 | Liang et al. | 119/712 |

FOREIGN PATENT DOCUMENTS

GB    2430830    4/2007
JP    2002-34377    2/2002

* cited by examiner

*Primary Examiner* — Eric M Blount (57) ABSTRACT

Disclosed is a system and method for monitoring and displaying the activities and behaviours of animals over a period of time. The display includes a sequence of visual representations correlating to the activities of the animal.

20 Claims, 4 Drawing Sheets

MONITORING AND DISPLAYING ACTIVITIES

FIELD OF THE INVENTION

The present invention relates to a system and method for monitoring and displaying the activities and behaviour of animals. More particularly, but not exclusively, the present invention relates to determining and displaying an animal's behaviour as a sequence of visual representations of the animal's activity.

BACKGROUND TO THE INVENTION

There exists in the prior art different methods and systems for monitoring animals such as WO2005/070326, which discloses an oestrus determination system that comprises sensors on an animal to determine one or more behaviours of the animal, means for storing the sensor data and one or more processors to process the sensor data to generate an indication of whether the animal is in oestrus. The data is analysed by determining the presence of typical patterns that occur in the various sensor types when the animal is in oestrus. However the data is displayed in the form of simple graphs, such as activity and inactivity and milk production. There is no mention of the display of a visual sequence to enable a viewer to see the behaviour of the animal, such as by inferring from the basic measured sensor data, such as periods of activity, and interpreted data, such as the type of activity being performed during the active periods.

The document WO02/092101 discloses a system for analysing animal behaviour by collecting physical and biological data from a variety of sensors. The data is then interpreted using pattern recognition to assess the behaviour of the animal, for determining the effects of drugs in clinical trials. The document discloses graphical display of the collected data in the form of charts and diagrams that show specific behaviour exhibited over time. However the system doesn't display a sequence of the basic and interpreted activities of the animal over time.

US2002/091326 discloses an information acquisition system that includes sensors for detecting the physiological state, such as pulse and heartbeat, and physical state, such as posture or action state, of a person or animal. The system also includes means for transmitting the information from the sensors and means for evaluating the information to determine an abnormality in the state of the person or animal. Although the system doesn't include visually showing the behaviour of the animal as a sequence of images derived from the sensor data.

JP2005196398 discloses a system for analysing the behavioural patterns of small animals using video images of the animals' movements, wherein the images are processed to simplify the contained information and analysed for particular image patterns. The information obtained from the analysis is displayed in time-variation graphs. However the system doesn't display results of the analysis as a sequence of images.

U.S. Pat. No. 6,375,612 discloses a system for monitoring the movement of animals by collecting the positional data of the animals over time to generate data representing the movement patterns of the animals. The movement patterns can be used to determine at least one physical condition of the animals, such as increased movement to water areas, or overall decreased movement may indicate poor health. The data is analysed by comparing the movement patterns of each animal to reference movement patterns. The system does not provide a sequence of visual representations from the analysed data to allow further interpretation of the behaviour of the animals.

U.S. Pat. Nos. 6,941,239 and 6,571,193. Disclosed in these documents is a system for recognising actions, wherein sensors are attached to an object such as a human, animal or machine and the sensor provides data on a state change, such as an action or movement, of the object. A characteristic quantity is determined from the measured sensor data by Fourier analysis, or some other frequency analysis. The frequency characteristics of the movement or action, as indicated by the sensor data, are used as the characteristic quantity for comparison with reference data to determine the identity of the movement or action. Combinations of movements, such as waving one hand while walking, may also be determined by extracting the individual frequency characteristics of the components of the action/movement combination. The frequency characteristics of the actions and movements are used in this system because such frequency spectrums are readily analysed and recognised by computer means.

In this system the actions and movements when compared to reference spectrum can be expressed, as probabilities when there is not a perfect match with reference spectrums, such as 0.67 probability of brisk walking and 0.33 probability of running. To aid in analysis by an observer, the data may then be used to animate a character to show the motion or action as determined by the frequency analysis. Thus the character would be animated with a motion characterised by a combination of brisk walking with a relative strength of 0.67 and running with a relative strength of 0.33. This enables an observer to more directly see the motion that the frequency analysis has determined—which may be more informative than the probability expression alone. However this system only displays determinations of specific actions, and does not enable a user to view a sequence of activities to determine the overall behaviour of an animal.

SUMMARY OF THE INVENTION

As used herein the term 'animal' refers to any member of the animal kingdom, including but not limited to livestock, such as cattle, sheep, goats, chickens, horses, and swine, companion animals such as cats, dogs, birds, fish and rodents, and humans.

As used herein the term 'specific activities' refers to any distinguishable action or activity displayed by an animal, including any single action or any particular combination of actions that may be described or otherwise characterised. Including but not limited to walking, running, trotting, jumping, greeting, sniffing, hunting, digging, marking, urinating, basking, rolling, grooming, scratching, sleeping, eating, drinking. Also included are activities distinctive of particular health conditions or other biological conditions, including but not limited to scratching for fleas, limping, and whimpering.

As used herein the term 'visual representation' refers to any manner of visually displaying an activity or event. This includes but is not limited to an icon or symbol that can be activated or otherwise displayed, a photograph, series of photographs or a video image of an actual animal or animals that may or may not include the animal being monitored, a graphical or diagrammatical image, or a series of such images, and an animation such as a computer generated animation.

As used herein the term 'fanciful component' refers to a feature or element that may be added to a visual representation in order to add further detail that increases the distinctiveness of the visual representation.

As used herein the term 'environmental conditions' refers to the ambient conditions around the animal, including but not limited to the temperature, humidity, noise level, air pressure, light levels, wind speed and rainfall.

As used herein the term 'physiological state' refers to the condition of an animal in regard to physical and biological functions, including but not limited to the heart rate, breathing rate, blood pressure levels, blood sugar level, stress level, pupil dilation, skin conductivity, and brain activity of the animal.

As used herein the term 'sensor arrangement' refers to a sensor system or assembly that contains the sensors and if necessary any other peripheral devices or components required for operation of the sensors, and transmittance or communication of the sensor data.

In one aspect the invention broadly consists in a method for displaying the behaviour of an animal, comprising:
identifying from the movements of said animal a sequence of specific activities; and
displaying a sequence of visual representations corresponding to said sequence of specific activities.

In another aspect the invention broadly consists in a method for observing the behaviour of an animal, comprising:
detecting movements of the animal using at least one sensor attached to the animal;
collecting movement data from the at least one sensor;
identifying from the movement data a sequence of specific activities of the animal; and
displaying a sequence of visual representations corresponding at least partially to said sequence of specific activities.

Preferably the specific activities are identified by at least partially matching movement data detected by the at least one sensor with reference movement data.

Preferably the sequence of visual representations includes at least one representation of an activity that corresponds to an exact match of the movement data with reference data.

Preferably the sequence of visual representations includes at least one representation of an activity that corresponds to a probabilistic match of the movement data with reference data.

Preferably at least one of the visual representations includes at least one fanciful component to improve the distinctiveness of said representation, and said fanciful component does not necessarily correspond to the actual activity of the animal.

Preferably the sequence of visual representations includes an indication of the intensity and/or duration of at least one of the specific activities.

Preferably the sequence of visual representations further includes indications of the environmental conditions present during the specific activities of the animal.

Preferably the sequence of visual representations further includes indications of the physiological state of the animal during the specific activities of the animal.

Preferably the visual representations are computer-generated images.

Preferably the method further includes the generation of an alert notification when at least one predetermined activity or sequence of specific activities is identified.

Preferably wherein the alert notification is a visual and/or aural signal on a computer system and/or the alert notification is an email, SMS or MMS message.

In another aspect the invention broadly consists in an animal monitoring system, comprising:
a sensor arrangement including at least one sensor, for attachment to an animal;
a data collection means for collecting data from the sensor arrangement;
processing means providing:
means for identifying from the sensor data a sequence of specific activities of the animal, and
a sequence of visual representations for display corresponding to said sequence of specific activities.

Preferably the processing means is computer software providing instructions for use by a computer processor.

Preferably the sensor arrangement includes one or more sensors selected from sensors capable of detecting movement, vibration, tilt, location, sound, temperature, light level, humidity, heart rate, breathing rate, and odour.

Preferably the data collection means is a wireless receiving station that receives signals from the sensor arrangement by means of a wireless transmitter.

Preferably the data collection means is linked to a computer network.

Preferably the data collection means is accessible via the internet.

Preferably the processing means for identifying the specific activities includes functionality for at least partially matching data detected by the at least one sensor with reference data.

Preferably the processing means for identifying the specific activities includes functionality for exactly matching sensor data with reference data.

Preferably the processing means for identifying the specific activities includes functionality for probabilistically matching sensor data with reference data.

Preferably the processing means providing a sequence of visual representations for display includes functionality for adding at least one fanciful component to improve the distinctiveness of any of the representations, wherein said fanciful component does not necessarily correspond to the actual activity of the animal being monitored.

Preferably the processing means providing a sequence of visual representations for display includes functionality for indicating the intensity and/or duration of at least one of the specific activities.

Preferably the processing means providing a sequence of visual representations for display includes functionality for adding indications of the environmental conditions present during the specific activities of the animal.

Preferably the processing means providing a sequence of visual representations for display includes functionality for adding indications of the physiological state of the animal during the specific activities of the animal.

Preferably the processing means includes functionality for the generation of an alert notification when at least one predetermined activity or sequence of specific activities is identified.

Preferably the alert notification is a visual and/or aural signal on a computer system, and/or an email, SMS or MMS message.

BRIEF DESCRIPTION OF THE FIGURES

Preferred forms of the method and system of the invention will now be described with reference to the accompanying figures in which.

DETAILED DESCRIPTION OF THE PREFERRED EMBODIMENTS

Preferred System

In, reference to the figures, the preferred embodiments of the animal monitoring system are illustrated. With regard to FIG. 1, the animal monitoring system comprises a sensor arrangement 10 for attachment in use to an animal. The sensor arrangement includes at least one sensor for generating data that may be used to determine the animals behaviour and wellbeing. The data is communicated to the data collection means, which in this case is a receiving station 11, and a processing means 12.

Preferably the processing means is computer software providing instructions for use by a computer processor.

Figure 1:
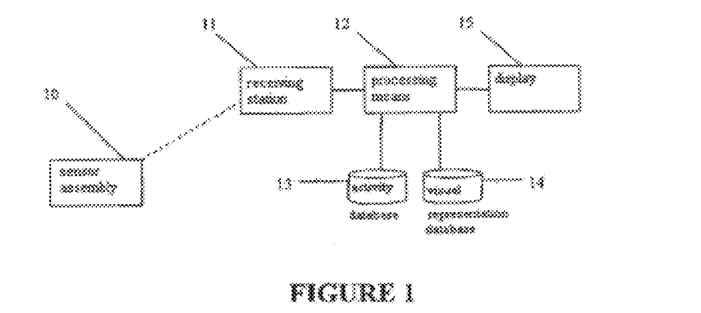
FIG. 1 shows a schematic view of a preferred system.

The computer software provides the instructions for the processing means to identify from the sensor data the specific activities of the animal by comparing the collected data with reference data from a database 13. The computer software then determines a sequence of activities that the animal has engaged in, and that sequence may be displayed as a sequence of visual representations on a display means 15.

Sensor Arrangement

Figure 2:
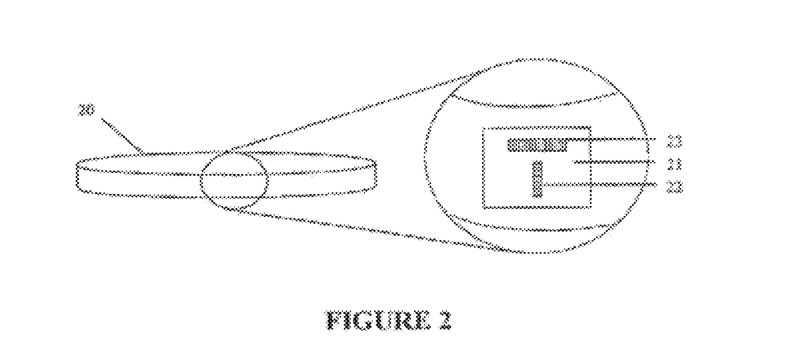
FIG. 2 shows an example of a sensor arrangement.

The sensor arrangement 10 is preferably in the form of a collar that is fitted around the animal's neck. Other forms of sensor arrangement may also be used, such as tags, cuffs, subcutaneous devices or the like. Alternatively the sensor arrangement may be in a form suitable for connection to a separate animal-attachment means, such as in the form of a device that may be fastened or adhered to a collar.

The sensor arrangement 10 senses at least one type of data relating to the animal or the animal's environment, but more preferably two or more. Combinations of data that the sensor assembly may detect includes: (i) two or more types of motion of the animal; (ii) two or more indications of the environmental conditions around the animal; (iii) at least one type of movement of the animal and at least one indication of the environmental conditions around the animal. Examples of animal movements that can be detected include walking, head shaking and head tilting. Examples of indications of the environmental conditions include light levels, air temperature and sound levels.

An example sensor arrangement is shown in the form of a collar 20 in FIG. 2. The collar may be made using any conventional shape, design and material suitable for the animal being monitored, with the addition of the sensors, and although not shown the sensor arrangement will also include a power source, such as a battery, and means for transmitting the data to the data collection means.

The sensors in the sensor arrangement 20 are indicated generally as 21. In the form shown, a first tilt switch 22 and a second tilt switch 23 are provided in different orientations. Other sensors may also be provided, including but not limited to vibration, temperature and humidity.

The tilt switches may be arranged differently to detect different movements of the animal's head. For example one tilt switch may be arranged to detect the movement of the animal's head in a pitch-like motion, such as lowering of the animal's head when eating or drinking, or the rhythmic head movement associated with walking or running.

The other tilt switch may be arranged to detect the movement of the animal's head in a roll-like motion, such as side-to-side shaking of the animal's head or the occasional tilting of the animal's head when the animal has an ear infection or fleas.

The sensor data from the sensors is preferably forwarded to a processor within the sensor arrangement, which in one embodiment stores all of the data generated by the sensors into a memory unit also within the sensor arrangement. Preferably the processor selectively or controllably stores the data in the memory unit. For example with reference to the sensor arrangement of FIG. 2, if one tilt switch detects substantially no pitch-like motion, but the other tilt-switch detects roll-like motion, the processor may only store within memory the data of the roll-like motion.

The processor may also be programmed to only store or transmit data in pre-determined time intervals, which may be different for the different sensors. For example the processor will need to store and/or transmit data at smaller time intervals, i.e. more regularly, for a movement sensor designed to detect walking, than a temperature sensor, as the condition of the temperature will change more slowly than the movement sensor.

The use of a processor to selectively or controllably store or transmit the data from the sensors is advantageous by reducing the amount of data stored or transmitted to only data that is significant. The processor may also transmit the data to the data collection means in short bursts and/or compress the data for shorter transmissions to reduce drain on the power supply by the transmitting means.

Receiving Station and Processing Means

Referring to FIG. 1, the data from the sensor arrangement 10 is forwarded to a receiving station 11 for further processing. In a preferred form the receiving station is an internet location.

The forwarding of the data from the sensor arrangement in the preferred form may be achieved by physically connecting the sensor arrangement 10 to the receiving station 11. For example, the sensor arrangement may be provided with a port to communicate with a computer via a computer cable. The data would be stored in the memory unit of the sensor arrangement and then transferred to the computer via the cable. Optionally a computer program could then forward the data to an internet-based receiving station 11.

In another form, the forwarding of the signals from the sensor assembly 10 is achieved wirelessly. For example, the data may be forwarded over radio or cellular systems. The data may be forwarded to an internet based receiving station 11 over an 802.11b or WiFi wireless network, or the like. To preserve the battery life of the sensor arrangement 10, the data from the sensors may be forwarded only when a change in the state or level occurs, such as a movement of the animal or change in the temperature of the environment.

When the data is received at the receiving station 11, it is processed by a processing means 12, which is preferably controlled by computer software. The computer software has two primary tasks, to determine the specific activities of the animal, and to produce a sequence of visual representations showing the specific activities and other environmental conditions.

Identification of the Specific Activities

In the identification stage, computer software instructs the processing means 12 to compare the data from the sensor arrangement with reference data, to determine if know patterns have occurred and thereby identifying specific activities of the animal. The comparison may take into account the combination of the duration and intensity of any of the sensor data and using either an exact match of sensor data patterns with reference data, or a probabilistic match of sensor data with reference data.

Figure 3:
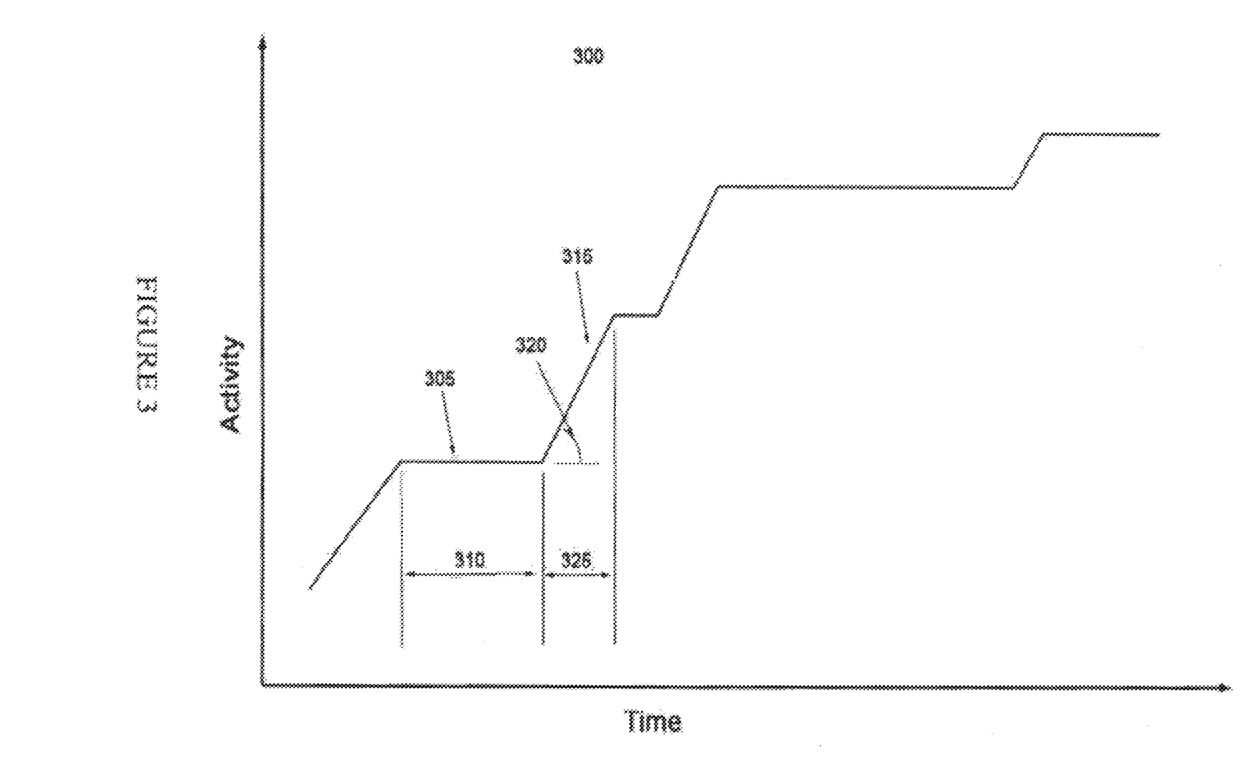
FIG. 3 shows a representation of movement data generated from sensor data.

FIG. 3 shows a graphical representation of movement data from a movement sensor. Plateau 305 for example represents a period of inactivity for a duration indicated at 310. Slope 315 represents a period of activity. The steepness 320 of this slope represents the intensity of activity, and the duration of activity is indicated at 325.

As shown in FIG. 3, the cumulative daily activity recorded by one of the sensors can be divided into periods of activity and inactivity. The number of periods or intervals may depend on the required level of detail. At low levels the data can be split into a small number of periods and at high levels the data can be split into a much larger number of shorter periods.

Each period of activity can be described by a start time, a duration and an intensity. Inferences can then be made about the nature of the activity. A steep slope will indicate a period of intense activity, such as running, and a plateau would indicate an activity such as sitting or lying down. To distinguish between lying down and sitting, the duration of activity could be analysed. Short periods would suggest sitting, while long periods would indicate sleeping or lying down.

It is possible for periods of activity and inactivity can be determined from a single main sensor. Additional information on what is happening during periods of activity can then be determined by looking at the readings of the other sensors during the period of interest. A sensor configured to detect cross plane movement would indicate which side an animal is lying on, and its level of activity, or reveal if the animal is scratching.

Arranging sensors that only react in a particular plane, allows the splitting up of movement into basic components. These basic components are equivalent to roll, pitch and yaw. The level of detail revealed by the sensor arrangement depends on its compositions. A greater number of sensors will reveal a greater amount of information.

To determine a sequence of specific activities, the data is analysed sequentially and specific activities can be identified by comparing the sequence of data with known reference data. The reference data for comparison can be from a library of data from the monitoring of different animals, different individuals of the same animal, one particular animal—such as the animal currently being monitored, or any combination thereof. Pattern matching techniques and computer logic, including fuzzy logic, as known to those skilled in the art may be used to identify the specific activities by comparing the data with reference data.

Figure 4:
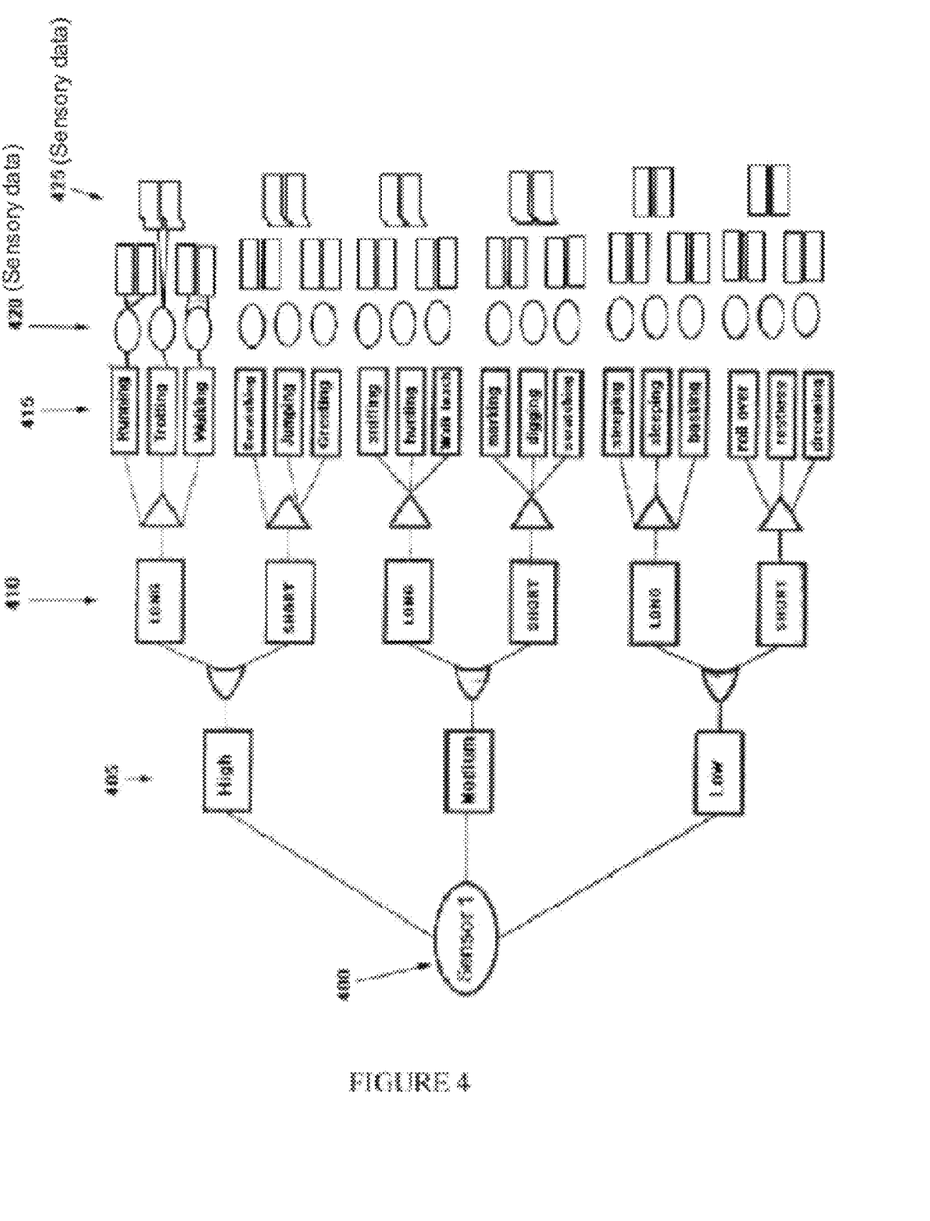
FIG. 4 shows a sample decision tree of rules to apply to the movement data.

FIG. 4 shows a sample decision tree of rules to apply to movement data. As shown in the figure, the reading from one sensor 400 exhibits an intensity value of high, medium or low indicated at 405. The same sensor exhibits a duration of intensity indicated at 410. Based on a match of stored sequences retrieved from the reference database, a list of possible specific activities 415 are obtained.

For example, a high sensor reading or short duration indicates the characteristics of either scratching, jumping or greeting. To distinguish which of these activities the animal is engaged in, different sensor data such as 425 and 420 is used to as a further characterisation.

In one embodiment the interpretation of the activities is divided into three levels or categories. Category A routines are accurate and indicate periods of either activity or inactivity.

More detailed activities are represented by category B. Category B activity predictions are mostly driven by the data, but in periods of uncertainty probabilistic determinations are used.

Category C activity types are fanciful and are designed to make the visual representations within a sequence more distinctive. For example a user may view a sequence of visual representations showing a dog lying down and it may not be explicitly clear whether or not the dog is sleeping. The addition of a fanciful component, such as an indication that the dog is dreaming or that the dog is snoring adds extra visual information to the sequence for better understanding and interpretation by the viewer. Although it is possible that while the dog was sleeping that it was snoring or dreaming, this may not have necessarily been determined by any sensors.

The identification of the sequence of activities of an animal may also be used to determine the wellbeing of the animal. For example if the data from the sensors indicates that the animal, such as a dog, is frequently scratching, this may indicate to the user viewing the sequence, or the processing means identifying the sequence, that the dog has fleas. Examples of the how particular sensor data can be used to determine health problems is indicated in Table 1 below.

TABLE 1

Patterns of Sensor Data Associated with Possible Health Problems

| Sensor A | Sensor B | Possible Health Problem |
| --- | --- | --- |
| Tilt - ON | Motion - OFF | Ear infection |
| Tilt - ON | Vibration - ON | Fleas |

An increase in the frequency of a dog rolling over during a defined period, such as a day, may indicate an emerging problem such as fleas or itchy skin.

As noted in the table above, the present invention may be used to determine if the animal has an ear infection. It has been found that an animal, such as a dog, with an ear infection generally tilts its head, even at rest, or shakes its head. Therefore sensing a tilt in the animal's head in the absence of general movement may be indicative of an ear infection.

It has been found that an animal, such as a dog, attends to any itch caused by fleas by tilting its head and scratching the itch with its hind leg. Therefore, by sensing the head tilt and the vibrations associated with scratching, the present invention may be used to determine when an animal has fleas.

Sequence of Visual Representations

In addition to determining the specific activities of the animal, the processing means 12 also determines a sequence of visual representations. In one form this involves selecting visual representations of the specific activities of the animal from a database. This enables a user to view the behaviour of an animal over a desired time period, without needing to analyse the actual data from the sensors.

Referring to FIG. 1, the processing means 12 has access to a database of visual representations 14. The database 14 includes the required information and data to display a visual representation for each of the specific activities, including any fanciful components, provided for in the database 13.

The sequence of visual representations may also show the environmental conditions around the animal, such as temperature, light, noise, and rainfall corresponding to the activities performed by the animal. Likewise the physiological data of the animal may also be shown, such as the heart-rate and breathing rate.

In a preferred form, the sequence of visual representations corresponds to a combination of the three levels of detail, A, B and C, of the sequence of specific activities identified by the processing means 12. For example a particular visual representation may be defined as: A2B3C1(8). This means that the visual representation for the specific activity comprises routine 2 at level A, routine 3 at level B, and routine 1 at level C, and it is 8 seconds long. For example, a sequence of visual representations may be:

A2B3C1(3)
A2B3C3(2)
A2B3C1(3)

A2B3C4(5)
A1B2C2(4)
A1B2C1(6)
A1B3C1(7)

Such a sequence represents the animal's behaviour over a much longer period than the length of the visual sequence itself. In most cases the results of a 24 hour monitoring would be summarised in a 120 second sequence, that is an average of 5 seconds for each hour. Although the compression of time throughout the sequence may be variable. For example, a diurnal animal may sleep for long periods at night, thus the sequence of visual representations may simply show that during the night the animal sleep with no other specific activities noted, and provide greater detail in terms of time, when the animal is active.

The individual visual representations in the database 14 may be fixed images or animations for each specific activity. In one form, one visual representation is provided for each of a plurality of animals, for each specific activity or condition in the database 13. In this form the visual representations may be chosen by the processing means to suit a particular animal. For instance, if the animal being monitored is a dog, the visual representation may be selected to represent the particular breed of dog.

Once established, the sequence of visual representations is displayed on the display means 15. The display means 15 may be, for example, a television or computer screen. The display means 15 may also form part of a communication device, such as a cellular telephone or a Personal Digital Assistant (PDA).

External Devices

The system and method of the present invention may be enhanced by providing sensors on devices that may be used by the animal being monitored. Data from the devices may be used in combination with data from the sensor arrangement to improve the identification of the animals activities and behaviour.

The animal's surroundings, such as a kennel for a dog, or the dog's bed may be provided with a sensor or transponder to determine and record the animal's movement in its surroundings. Sensors such as proximity sesnsors and transponders such as those used in radio frequency identification (RFID) may be employed. In this way the owner can determine if the animal is psending to much time in one place, which may be caused by restlessness, lethargy or a serious illness.

Like the sensor arrangement, the sensors for the external devices may also include a memory unit to store data, and a processor to selectively or controllable store or forward data to a data collection means.

Preferred Method

Figure 5:
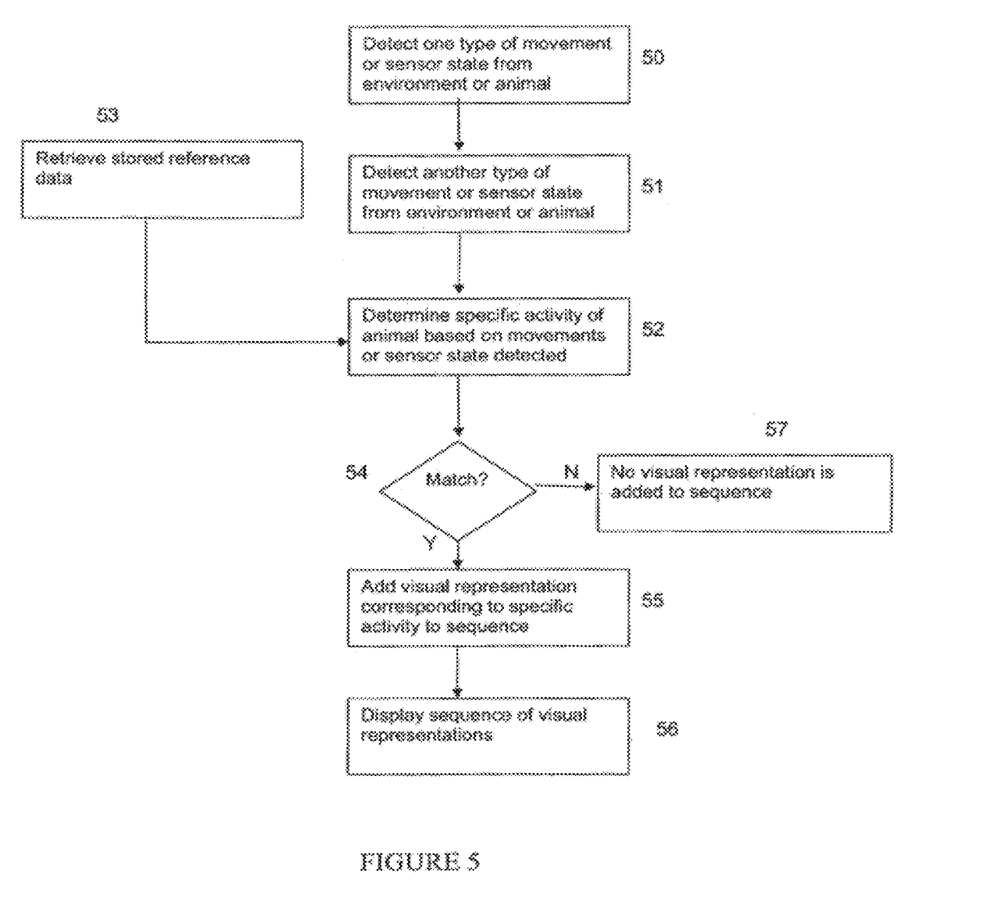
FIG. 5 shows a flow chart of a preferred method.

Referring to FIG. 5, the preferred method is illustrated in the form of a flow chart. The method begins at step 50 with the detection of one type of movement of the animal or sensor state concerning the environment around the animal being monitored, or the physiological condition of the animal. In step 51, another type of movement of the animal or sensor state concerning the environment around the animal being monitored, or the physiological condition of the animal is detected. Optionally further detection steps may be included after step 51. Data from the detection steps above is then compared with reference data from a database in step 52.

A decision tree of rules is one method of interpreting the movement data. Alternatively, the animal's own historical data can be compared so the analysis looks for change in the pattern typically generated by the animal. For example the animal may start to move a lot less frequently than usual for that time of the day, and this may signify a problem. The data obtained from the animal can be compared with other animals of a similar age and breed or to an average from a range of animals.

In another form, the method of the invention begins at step 53, wherein reference data is retrieved from a database. This data may have been stored following an earlier detection of the animal's movement or sensor state concerning the environment or physiological condition of the animal. In this form, the correlation in step 52 is made by comparing the retrieved data with the information in the database.

The correlation of the signals in step 52 essentially involves checking the presence of a specific activity that corresponds to the data as detected. This may either be an exact match or a partial match of the sensor data with the reference data. The outcome of the checking is decided in step 54. The If there is a specific activity that corresponds to the signals as detected, the method proceeds to step 55, wherein a visual representation of the specific activity is retrieved from the database and added to the sequence. The type of visual representation will depend on the level of detail of the data match. A highly correlated type 'A' animation routine or image indicates the more basic actions, such as activity or inactivity, while the less correlated type 'B' animation routine or image corresponds to a higher level of detail in the visual representation. A further component may also be added to the visual representation as a type 'C' animation routine or image, which is fanciful and serves the purpose of adding further distinctiveness to the visual representation of the specified activity of the animal.

The sequence, once established may then be forwarded to a display device in step 56. A user may then viewing the sequence may then observe the behaviour of the animal, being the combinations of activities of the animal in context of the surrounding environmental conditions and physiological condition of the animal. Either the user or further processing of a computer system or other processor may determine from the behaviour of the animal if it is suffering from an adverse health condition or any other discernible biological condition.

If a certain condition is identified by a processing means, an alert notification may be generated, such as a pop-up on a computer screen, an SMS or MMS message sent to a mobile phone, or an email message.

The invention claimed is:

1. A method for displaying the behaviour of an animal, comprising: detecting movements of the animal using at least one sensor attached to the animal; collecting movement data from the at least one sensor in a pre-determined time interval; identifying from the movements of said animal a sequence of specific activities by comparing the movement data with known reference data; displaying a sequence of visual representations corresponding to said sequence of specific activities, wherein the sequence of visual representations is assigned a time period which is shorter in duration than the pre-determined time interval and the sequence of visual representations is used to assess the health of the animal based on the movement data.

2. A method for observing the behaviour of an animal, comprising: detecting movements of the animal using at least one sensor attached to the animal; collecting movement data from the at least one sensor in a pre-determined time interval; identifying from the movement data a sequence of specific activities of the animal by comparing the movement data with known reference data; displaying a sequence of visual representations corresponding at least partially to said sequence of specific activities, wherein the sequence of visual representations is assigned a time period which is shorter in duration than the pre-determined time interval and is used to assess the health of the animal based on the movement data.

3. The method of claim 1, wherein the specific activities are identified by at least partially matching movement data detected by the at least one sensor with reference movement data.

4. The method of claim 1, wherein the sequence of visual representations includes at least one representation of an activity that corresponds to an exact match of the movement data with reference data.

5. The method of claim 1, wherein the sequence of visual representations includes at least one representation of an activity that corresponds to a probabilistic match of the movement data with reference data.

6. The method of claim 1, wherein at least one of the visual representations includes at least one fanciful component to improve the distinctiveness of said representation, and said fanciful component does not necessarily correspond to the actual activity of the animal.

7. The method of claim 1, wherein the sequence of visual representations includes an indication of the intensity and/or duration of at least one of the specific activities.

8. The method of claim 1, wherein the sequence of visual representations further includes indications of the environmental conditions present during the specific activities of the animal.

9. The method of claim 1, wherein the sequence of visual representations further includes indications of the physiological state of the animal during the specific activities of the animal.

10. The method of claim 1, wherein the visual representations are computer-generated images.

11. The method of claim 1, further including the generation of an alert notification when at least one predetermined activity or sequence of specific activities is identified.

12. The method of claim 11 wherein the alert notification is a visual and/or aural signal on a computer system.

13. The method of claim 11 wherein the alert notification is an email, SMS or MMS message.

14. An animal monitoring system, comprising: a sensor arrangement including at least one sensor, for attachment to an animal; a data collection means for collecting data from the sensor arrangement in a pre-determined time interval; processing means providing: means for identifying from the sensor data a sequence of specific activities of the animal by comparing the movement data with known reference data, and a sequence of visual representations for display corresponding to said sequence of specific activities, wherein the sequence of visual representations is assigned a time period which is shorter in duration than the pre-determined time interval and is used to assess the health of the animal based on the movement data.

15. The animal monitoring system of claim 14, wherein the processing means is computer software providing instructions for use by a computer processor.

16. The animal monitoring system of claim 14, wherein the sensor arrangement includes one or more sensors selected from sensors capable of detecting movement, vibration, tilt, location, sound, temperature, light level, humidity, heart rate, breathing rate, and odour.

17. The animal monitoring system of claim 14, wherein the data collection means is a wireless receiving station that receives signals from the sensor arrangement by means of a wireless transmitter.

18. The animal monitoring system of claim 14, wherein the data collection means is linked to a computer network.

19. The animal monitoring system of claim 14, wherein the data collection means is accessible via the internet.

20. The animal monitoring system of claim 14, wherein the processing means for identifying the specific activities includes functionality for at least partially matching data detected by the at least one sensor with reference data.

* * * * *